(12) United States Patent
Kim et al.

(10) Patent No.: US 12,272,354 B2
(45) Date of Patent: Apr. 8, 2025

(54) ELECTRONIC DEVICE AND CONTROL METHOD THEREFOR

(71) Applicant: SAMSUNG ELECTRONICS CO., LTD., Suwon-si (KR)

(72) Inventors: Daewung Kim, Suwon-si (KR); Youngah Lee, Suwon-si (KR); Jibum Moon, Suwon-si (KR); Jiyeon Ma, Suwon-si (KR); Dahye Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 17/721,202

(22) Filed: Apr. 14, 2022

(65) Prior Publication Data

US 2022/0238111 A1 Jul. 28, 2022

Related U.S. Application Data

(63) Continuation of application No. PCT/KR2020/011451, filed on Aug. 27, 2020.

(30) Foreign Application Priority Data

Oct. 18, 2019 (KR) .................. 10-2019-0129937

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06F 3/167* (2013.01); *G06T 11/00* (2013.01); *G10L 15/08* (2013.01); *G06T 2200/24* (2013.01); *G10L 2015/088* (2013.01); *G10L 2015/223* (2013.01); *H04N 21/42203* (2013.01)

(58) Field of Classification Search
CPC ... G10L 15/22; G10L 15/08; G10L 2015/088; G10L 2015/22; H04N 21/42203; G06T 2200/24; G06F 3/167; G06F 3/165
See application file for complete search history.

(56) References Cited

U.S. PATENT DOCUMENTS

| | | |
|---|---|---|
| 6,545,209 B1 | 4/2003 | Flannery et al. |
| 10,665,227 B2 | 5/2020 | Hayakawa |

(Continued)

FOREIGN PATENT DOCUMENTS

| | | | |
|---|---|---|---|
| CA | 2793743 A1 * | 7/2011 | ............. B60K 35/00 |
| CN | 108877794 | 11/2018 | |

(Continued)

*Primary Examiner* — Mohammad K Islam
(74) *Attorney, Agent, or Firm* — Nixon & Vanderhye P.C.

(57) ABSTRACT

An electronic apparatus includes a receiver comprising input receiving circuitry, a speaker, a display, and a processor configured to: based on a speech being received, determine a vibe keyword corresponding to a vibe-related word included in the speech among a plurality of specified vibe keywords, generate an image and a sound corresponding to the speech based on a graphical user interface (GUI) component and a sound component corresponding to the determined vibe keyword, and display the generated image on the display and output the generated sound through the speaker.

12 Claims, 12 Drawing Sheets

(51) Int. Cl.
  *G06T 11/00* (2006.01)
  *G10L 15/08* (2006.01)
  *H04N 21/422* (2011.01)

(56) References Cited

U.S. PATENT DOCUMENTS

| | | |
|---|---|---|
| 2007/0244902 A1 | 10/2007 | Seide et al. |
| 2008/0005091 A1 | 1/2008 | Lawler et al. |
| 2017/0103748 A1* | 4/2017 | Weissberg ............... G10L 15/02 |
| 2018/0239820 A1 | 8/2018 | Jeong et al. |
| 2018/0240460 A1* | 8/2018 | Matsumoto ............ G10L 15/08 |
| 2019/0371319 A1 | 12/2019 | Wang |
| 2020/0043488 A1 | 2/2020 | Park |
| 2020/0058292 A1* | 2/2020 | Maeda .................. G06F 40/242 |
| 2020/0211534 A1 | 7/2020 | Horie |
| 2021/0158800 A1* | 5/2021 | Kim ....................... G06F 3/0484 |
| 2021/0193110 A1 | 6/2021 | Park et al. |
| 2022/0059071 A1* | 2/2022 | Pearce ............... H04N 21/4788 |

FOREIGN PATENT DOCUMENTS

| | | | | |
|---|---|---|---|---|
| JP | 2004343232 A | * | 12/2004 | ............. G10L 15/26 |
| JP | 4028375 B2 | * | 12/2007 | ......... G06F 16/3334 |
| JP | 2011-250100 | | 12/2011 | |
| JP | 5486467 | | 5/2014 | |
| JP | 2018-045127 | | 3/2018 | |
| JP | WO2018-061839 | | 6/2019 | |
| KR | 10-2009-0004990 | | 1/2009 | |
| KR | 10-2012-0083025 | | 7/2012 | |
| KR | 10-1377389 | | 3/2014 | |
| KR | 10-1804679 | | 12/2017 | |
| KR | 10-2018-0096182 | | 8/2018 | |
| KR | 10-2019-0024190 | | 3/2019 | |
| KR | 10-1981091 | | 5/2019 | |
| KR | 10-2019-0094314 | | 8/2019 | |
| WO | WO2003030150 A1 | * | 9/2002 | ............. G06F 3/167 |
| WO | 2019/073669 | | 4/2019 | |
| WO | WO-2020056329 A1 | * | 3/2020 | ............. G06F 3/167 |
| WO | WO-2020101389 A1 | * | 5/2020 | ............... G06F 3/16 |

* cited by examiner

ELECTRONIC DEVICE AND CONTROL METHOD THEREFOR

CROSS-REFERENCE TO RELATED APPLICATIONS

This application is a continuation of International Application No. PCT/KR2020/011451 designating the United States, filed on Aug. 27, 2020, in the Korean Intellectual Property Receiving Office and claiming priority to Korean Patent Application No. 10-2019-0129937, filed on Oct. 18, 2019, in the Korean Intellectual Property Office, the disclosures of which are incorporated by reference herein in their entireties.

BACKGROUND

Field

The disclosure relates to an electronic apparatus and a method for controlling the electronic apparatus, and for example, to an electronic apparatus which outputs an image and a sound corresponding to a user's speech and a method for controlling thereof.

Description of Related Art

In recent years, the electronic apparatus may perform various functions using a speech uttered by a user. For example, the electronic apparatus may reproduce a content according to the user's speech.

In this regard, it is necessary to search for solution that a user is able to change a surrounding environment into desired vibe through the electronic apparatus.

SUMMARY

Embodiments of the disclosure provide an electronic apparatus which generates and outputs an image and a content capable of creating a vibe requested by a user and a method for controlling thereof.

In accordance with an example embodiment of the disclosure, there is provided an electronic apparatus including: a receiver including input receiving circuitry, a speaker, a display, and a processor configured to: based on a speech being received through the receiver, determine a vibe keyword corresponding to a vibe-related word included in the speech among a plurality of specified vibe keywords, generate an image and a sound corresponding to the speech based on a graphical user interface (GUI) component and a sound component corresponding to the determined vibe keyword, and display the generated image on the display and output the generated sound through the speaker.

The processor may be configured to: based on a text converted from the speech including a word corresponding to a vibe and the vibe-related word modifying the word corresponding to the vibe, determine that the speech corresponds to a speech requesting for a specific vibe, and determine a vibe keyword corresponding to the vibe-related word included in the user's speech among the plurality of specified vibe keywords.

The processor may be configured to: based on the vibe-related word being matched with one of the plurality of specified vibe keywords, determine that the matched vibe keyword is the vibe keyword corresponding to the vibe-related word, and based on the plurality of specified vibe keywords not including a vibe keyword matched with the vibe-related word, determine that a vibe keyword most similar to the vibe-related word of the plurality of specified vibe keywords is the vibe keyword corresponding to the vibe-related word.

The processor may be configured to: determine a vector value corresponding to each of the plurality of specified vibe keywords and a vector value corresponding to the vibe-related word, and determine that a vibe keyword having a vector value with a shortest distance with the vector value corresponding to the vibe-related word among vector values corresponding to each of the plurality of specified vibe keywords is a vibe keyword corresponding to the vibe-related word.

The GUI component may include a plurality of background images and a plurality of image contents, and the processor may be configured to: overlay the plurality of image contents on the plurality of background images that change in sequence, and generate an image corresponding to the speech.

The sound component may include a plurality of background sounds and a plurality of sound contents, and the processor may be configured to: mix the plurality of sound contents with the plurality of background sounds that change in sequence, and generate a sound corresponding to the speech.

The processor may be configured to: generate an image and a sound corresponding to the speech based on a GUI component and a sound component corresponding to a user who has uttered the speech among the GUI components and the sound components for each of a plurality of users.

In accordance with an example embodiment of the disclosure, there is provided a method for controlling an electronic apparatus, the method including: based on a speech being received, determining a vibe keyword corresponding to a vibe-related word included in the speech among a plurality of specified vibe keywords, generating an image and a sound corresponding to the user's speech based on a graphical user interface (GUI) component and a sound component corresponding to the determined vibe keyword, and displaying the generated image and outputting the generated sound.

The determining may include, based on a text converted from the speech including a word corresponding to a vibe and the vibe-related word modifying the word corresponding to the vibe, determining that the speech corresponds to a speech requesting for a specific vibe, and determining a vibe keyword corresponding to the vibe-related word included in the speech among the plurality of specified vibe keywords.

The determining may include, based on the vibe-related word being matched with one of the plurality of specified vibe keywords, determining that the matched vibe keyword is the vibe keyword corresponding to the vibe-related word, and based on the plurality of specified vibe keywords not including the vibe keyword matched with the vibe-related word, determining that a vibe keyword most similar to the vibe-related word of the plurality of specified vibe keywords is the vibe keyword corresponding to the vibe-related word.

The determining may include determining a vector value corresponding to each of the plurality of specified vibe keywords and a vector value corresponding to the vibe-related word, and determining that a vibe keyword having a vector value with a shortest distance with the vector value corresponding to the vibe-related word among vector values corresponding to each of the plurality of specified vibe keywords is a vibe keyword corresponding to the vibe-related word.

The GUI component may include a plurality of background images and a plurality of image contents, and the generating may include overlaying the plurality of image contents on the plurality of background images that change in sequence, and generating an image corresponding to the speech.

The sound component may include a plurality of background sounds and a plurality of sound contents, and the generating may include mixing the plurality of sound contents with the plurality of background sounds that change in sequence, and generating a sound corresponding to the speech.

The generating may include generating an image and a sound corresponding to the speech based on a GUI component and a sound component corresponding to a user who has uttered the user's speech among the GUI components and the sound components for each of a plurality of users.

As described above, according to various example embodiments of the disclosure, the electronic apparatus may provide an image and a sound for creating a vibe desired by a user in real time, thereby changing a surrounding environment of the user into a vibe desired by the user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
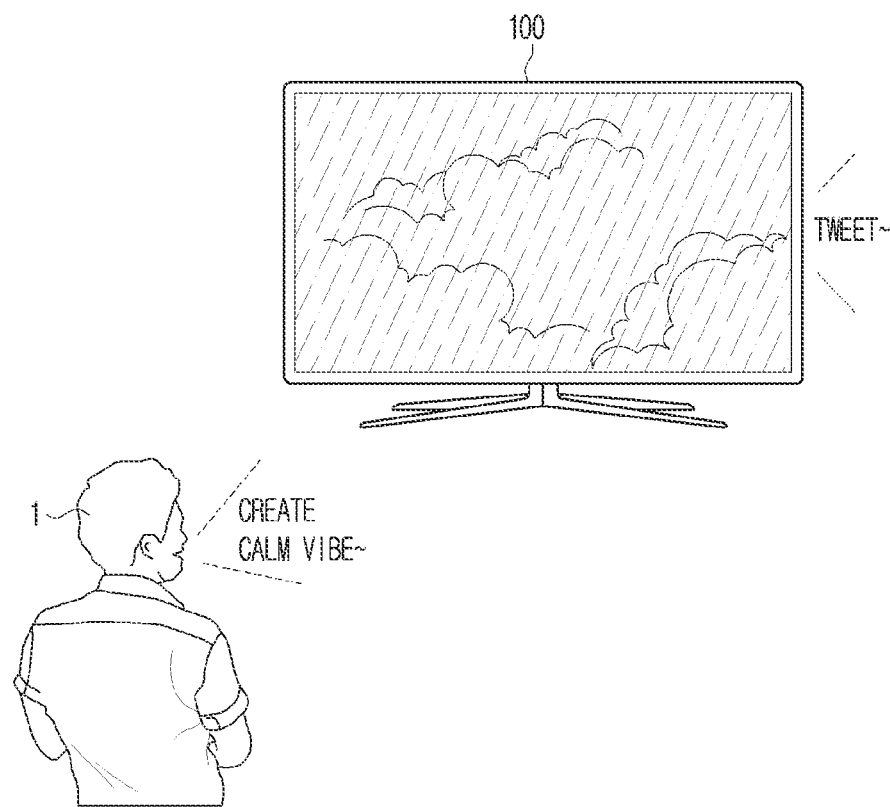
FIGS. 1A and 1B are diagrams illustrating an example electronic apparatus which provides a content matched with a vibe requested by a user according to various embodiments.

Hereinafter, various example embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and another element.

Also, the expression "configured to" used in the disclosure may be interchangeably used with other expressions such as "suitable for," "having the capacity to," "designed to," "adapted to," "made to," and "capable of," depending on cases. The expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

Figure 1B:
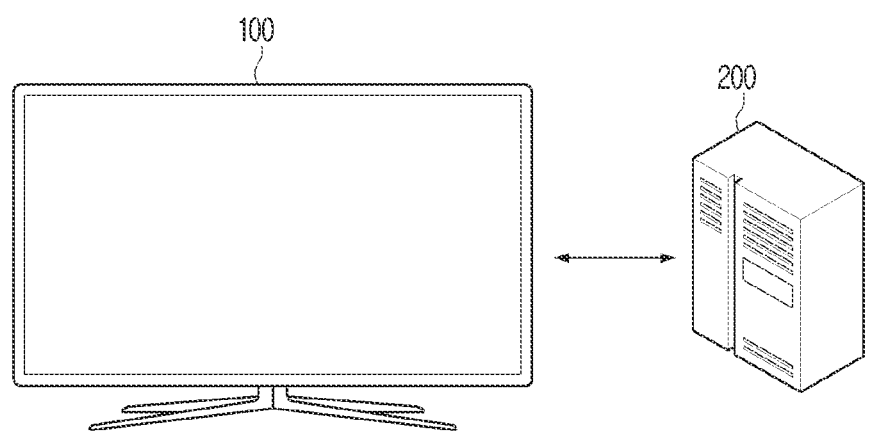

FIGS. 1A and 1B are diagrams illustrating an example electronic apparatus which provides a content matched with a vibe requested by a user according to various embodiments.

FIGS. 1A and 1B illustrate an electronic apparatus 100 as a TV, but this is merely an example, and the electronic apparatus 100 may be implemented as various types of devices provided with various displays and speakers such as, for example, and without limitation, a smartphone, a table PC, a mobile phone, a video phone, an electronic book reader, a desktop PC, a laptop PC, a netbook computer, a refrigerator, an air conditioner, a vacuum cleaner, an oven, a microwave, a washing machine, an air purifier, or an electronic frame, a wearable device, or the like.

Referring to FIG. 1A, the electronic apparatus 100 may provide a content matched to a vibe desired by a user.

The electronic apparatus 100 may obtain a user's speech. In this case, the user's speech may be received through a microphone (not illustrated) provided in the electronic apparatus 100. In addition, the electronic apparatus 100 may receive a user's speech obtained from another electronic apparatus including a microphone (not illustrated), for example, a remote control (not illustrated) for controlling the electronic apparatus 100 from the corresponding electronic apparatus.

The electronic apparatus 100 may convert the user's speech into a text and determine whether the user's speech corresponds to a speech requesting for a specific vibe using the text.

Accordingly, when the user's speech corresponds to the speech requesting for the specific vibe, the electronic apparatus 100 may generate and output a content capable of creating the vibe requested by the user.

For example, referring to FIG. 1A, it is illustrated by way of non-limiting example that a user 10 utters "create calm vibe".

In this case, the electronic apparatus 100 may generate an image and a sound capable of creating the calm vibe requested by the user and output the generated image and sound. For example, referring to FIG. 1A, the electronic apparatus 100 may display an image in which a blue background is overlaid with rain and clouds and output a sound of birds chirpings.

As described above, according to various embodiments of the disclosure, the electronic apparatus 100 may provide an image and a sound capable of creating the vibe desired by the user in real time, thereby changing the surrounding environment of the user into a vibe desired by the user.

FIG. 1A illustrates that the electronic apparatus 100 converts a user's speech into a text, but this is merely an example.

For example, referring to FIG. 1B, the electronic apparatus 100 may transmit the user's speech to a server 200. In this case, the server 200 may convert the user's speech into a text and transmit the converted text to the electronic apparatus 100.

As described above, an external electronic apparatus other than the electronic apparatus 100, for example, the server 200 may convert the user's speech into the text and transmit the text to the electronic apparatus 100.

Figure 2:
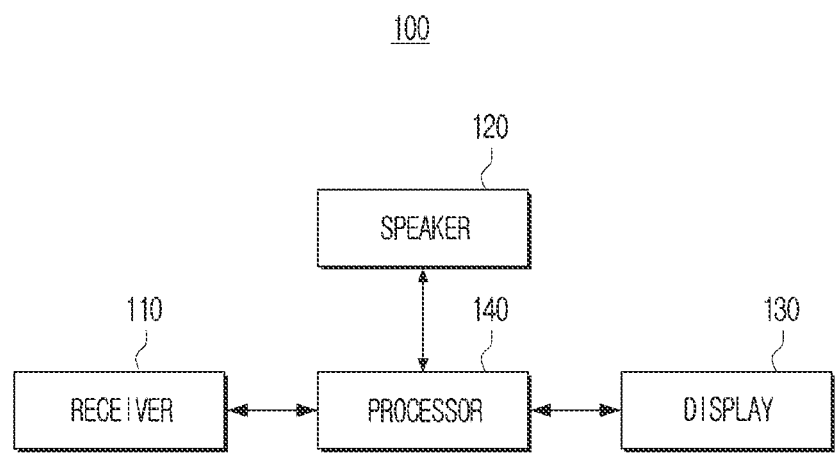
FIG. 2 is a block diagram illustrating an example configuration of the electronic apparatus according to various embodiments.

FIG. 2 is a block diagram illustrating an example configuration of the electronic apparatus according to various embodiments.

Referring to FIG. 2, the electronic apparatus 100 may include a receiver (e.g., including receiving circuitry) 110, a speaker 120, a display 130, and a processor (e.g., including processing circuitry) 140.

The receiver 110 may include various circuitry receive a user's speech. For this, the receiver 110 may include a microphone (not illustrated). In addition, the receiver 110 may include a communication interface (not illustrated), including various communication circuitry, for communicating with an external electronic apparatus including a microphone (not illustrated), for example, a remote control for controlling the electronic apparatus 100, and may communicate with the external electronic apparatus through this, and receive a user's speech obtained by the external electronic apparatus through the microphone from the external electronic apparatus.

The speaker 120 may output various sounds. For example, the speaker 120 may output a sound capable of creating the vibe requested by the user.

The display 130 may display various images. For example, the display 130 may display an image capable of creating the vibe requested by the user.

The processor 140 may include various processing circuitry and control general operations of the electronic apparatus 100. For example, the processor 140 may be electrically connected to the receiver 110, the speaker 120, and the display 130 to control general operations and functions of the electronic apparatus 100.

When a user's speech is received through the receiver 110, the processor 140 may determine a vibe keyword corresponding to a vibe-related word included in the user's speech among a plurality of predetermined vibe keywords.

In this example, when a text converted from the user's speech includes a word corresponding to a vibe and a vibe-related word modifying the word corresponding to the vibe, the processor 140 may determine that the user's speech corresponds to a user's speech requesting for a specific vibe, and determine a vibe keyword corresponding to the vibe-related word included in the user's speech among the plurality of predetermined vibe keywords.

The word corresponding to the vibe herein may be a noun "vibe" and the vibe-related word may be an adjective modifying the noun "vibe".

For this, when the user's speech is received through the receiver 110, the processor 140 may convert the user's speech into the text.

In addition, when the user's speech is received through the receiver 110, the processor 140 may transmit the received user's speech to the server 200 of FIG. 1B through a communication interface (not illustrated). In this case, the server 200 may covert the user's speech received from the electronic apparatus 100 into the text and transmit the text to the electronic apparatus 100, and the processor 140 may receive the text transmitted by the server 200 through the communication interface (not illustrated).

The processor 140 may determine whether the text converted from the user's speech includes a word "vibe" and an adjective positioned near the corresponding word (e.g., before or after) based on the word "vibe" and modifying the word "vibe".

For this, the electronic apparatus 100 may store in advance information on the "vibe" and information on various adjectives modifying the noun "vibe".

Accordingly, when the text converted from the user's speech includes the word "vibe" and the adjective positioned near the corresponding word based on the word "vibe", the processor 140 may determine that the user's speech corresponds to a user's speech requesting for a specific vibe.

For example, a text "Create calm vibe" includes the word "vibe" and an adjective modifying the word "vibe", that is a vibe-related word "calm". In this case, the processor 140 may determine that the user's speech "Create calm vibe" corresponds to a user's speech requesting for a specific vibe.

When the user's speech corresponds to the user's speech requesting for the specific vibe, the processor 140 may determine a vibe keyword corresponding to the vibe requested by the user.

For example, the processor 140 may determine one vibe keyword among the plurality of predetermined (e.g., specified) vibe keywords as a vibe keyword corresponding to the vibe requested by the user.

The plurality of vibe keywords may be defined in advance and examples thereof may include "exciting", "happy", "cozy", "calm", "dreamy", and "romantic".

For example, when the vibe-related word is matched with one of the plurality of predetermined vibe keywords, the processor 140 may determine that the matched vibe keyword is a vibe keyword corresponding to the vibe-related word.

For example, since the vibe-related word "calm" in the text "Create calm vibe" is matched (or coincides with) "calm" among the plurality of predetermined vibe keywords, the processor 140 may determine that the vibe keyword of the user's speech "Create calm vibe" is "calm" among the plurality of predetermined vibe keywords.

When there is a keyword matched with the vibe-related word among the plurality of predetermined vibe keywords, the processor 140 may determine that a keyword of the plurality of predetermined vibe keywords which is most similar to the vibe-related word is the vibe keyword corresponding to the vibe-related word.

For this, the processor 140 may identify a vector value corresponding to each of the plurality of predetermined vibe keywords and a vector value corresponding to the vibe-related word.

In this case, the processor 140 may identify the vector value corresponding to each of the plurality of predetermined vibe keywords and the vector value corresponding to the vibe-related word using a dictionary including a vector value of each of a plurality of adjectives.

The dictionary may include, for example, a word2vec dictionary including vector values represented by vectorising words in a k dimension in consideration of meaning of words, and the electronic apparatus 100 may store in advance the word2vec dictionary including the vector value of each of the plurality of adjectives.

In addition, the processor 140 may determine that a vibe keyword having a vector value corresponding to the vibe-related word and a vector value with the shortest distance (e.g., Euclidean distance) among the vector values corresponding to each of the predetermined vibe keywords is the vibe keyword corresponding to the vibe-related word.

For example, it is assumed that the user's speech is "Create pleasant vibe". In this case, the processor 140 may identify that "pleasant" in "Create pleasant vibe" is the vibe-related word and identify a vector value of "pleasant" using the word2vec dictionary.

In addition, the plurality of vibe keywords are "exciting", "happy", "cozy", "calm", "dreamy", and "romantic", the processor 140 may identify a vector value of "exciting", a vector value of "happy", a vector value of "cozy", a vector value of "calm", a vector value of "dreamy", and a vector value of "romantic" using the word2vec dictionary.

The processor 140 may identify a vector value with the shortest distance with the vector value of "pleasant" among the vector value of "exciting", the vector value of "happy", the vector value of "cozy", the vector value of "calm", the vector value of "dreamy", and the vector value of "romantic".

In this example, when a distance between the vector value of "exciting" and the vector value of "pleasant" is shorter than distances between other vectors, the processor 140 may determine that the vibe keyword of the user's speech "Create pleasant vibe" is "exciting" among the plurality of predetermined vibe keywords.

When the user's speech includes a plurality of vibe-related words, the processor 140 may determine that a vibe keyword of the plurality of predetermined vibe keywords which is most similar to the plurality of vibe-related words is the vibe keyword corresponding to the plurality of vibe-related words.

For example, the processor 140 may identify a vector value corresponding to each of the plurality of predetermined vibe keywords and a vector value corresponding to each of the plurality of vibe-related words using a dictionary including the vector value of each of the plurality of adjectives.

In addition, the processor 140 may add up the vector values of the plurality of vibe-related words, and determine that a vibe keyword having a vector value with the shortest distance with the added vector value among the vector values of each of the plurality of predetermined vibe keywords is the vibe keyword corresponding to the plurality of vibe-related words.

For example, it is assumed that the user's speech is "Create exciting and pleasant vibe". In this case, the processor 140 may determine that "exciting" and "pleasant" in "Create exciting and pleasant vibe" are vibe-related words, and identify a vector value of "exciting" and a vector value of "pleasant" using the word2vec dictionary.

In addition, when the plurality of vibe keywords are "exciting", "happy", "cozy", "calm", "dreamy", and "romantic", the processor 140 may identify a vector value of "exciting", a vector value of "happy", a vector value of "cozy", a vector value of "calm", a vector value of "dreamy", and a vector value of "romantic" using the word2vec dictionary.

The processor 140 may identify a vector value with the shortest distance with the vector value obtained by adding up the vector value of "pleasant" and the vector value of "exciting" among the vector value of "exciting", the vector value of "happy", the vector value of "cozy", the vector value of "calm", the vector value of "dreamy", and the vector value of "romantic".

In this example, when the when the distance between the vector value obtained by adding up the vector value of "pleasant" and the vector value of "exciting", and the vector value of "exciting" is shorter than distances between other vectors, the processor 140 may determine that the vibe keyword of the user's speech "Create pleasant and exciting vibe" is "exciting" of the plurality of predetermined vibe keywords.

Such a process may be represented by Mathematic Expression 1 as below.

$$\text{vibe keyword} = \underset{j}{\mathrm{argmin}} \left\| \sum_i \vec{w}_i - \vec{w}_j \right\| \quad \text{[Mathematic Expression 1]}$$

Herein, $\vec{w}_i$ represents a vector value of a vibe-related word and $\vec{w}_j$ represents a plurality of predetermined vibe keywords. $w_i \in \{\text{vibe-related word}\}$ and $w_j \in \{\text{predetermined vibe keyword}\}$. Accordingly, the processor 140 may identify a vibe keyword corresponding to the user's speech among the plurality of predetermined vibe keywords using Mathematic Expression 1.

The processor 140 may generate an image corresponding to the user's speech based on a graphical user interface (GUI) component corresponding to the identified vibe keyword and display the generated image on the display 130.

The GUI component may include a plurality of background images and a plurality of image contents.

The plurality of background images may be images with single colors such as green, yellow, blue, black, pink, and the like, and the plurality of image contents may include various environments such as sun, planets, rain, clouds, fog, stars, nebula, the Galaxy, shooting stars, various animals, various plants, and the like, various creatures and objects in the environment, and graphic objects, and the like.

For example, the processor 140 may identify a plurality of background images and a plurality of image contents corresponding to the identified vibe keyword among the plurality of background images and the plurality of image contents stored in the electronic apparatus 100.

For this, the electronic apparatus 100 may store a list of background images and a list of image contents predefined for each vibe keyword for each of the plurality of predetermined vibe keywords.

Accordingly, the processor 140 may determine that the plurality of background images and the plurality of image contents included in the predefined lists for the identified vibe keyword among the plurality of background images and the plurality of image contents pre-stored in the electronic apparatus 100 are the plurality of background images and the plurality of image contents corresponding to the identified vibe keyword.

In addition, the processor 140 may generate an image corresponding to the user's speech using the plurality of background images and the plurality of image contents corresponding to the identified vibe keyword.

For example, the processor 140 may overlay the plurality of background images which are changed in sequence with the plurality of image contents, and generate an image corresponding to the user's speech.

In other words, the processor 140 may transit the plurality of background images in sequence and generate the image corresponding to the user's speech by overlaying the background images with the plurality of image contents. In this case, the processor 140 may gradually transit one background image to another background image through a gradation effect.

In addition, the processor 140 may randomly select at least two of the plurality of image contents at every certain time interval, and overlay the background with a combination of the selected image contents. Accordingly, the combination of the background image overlaid with the image content may be randomly changed at every time interval. However, this is merely an example, and the processor 140 may randomly select one image content of the plurality of image contents and overlay the background image with the selected image content.

Figure 3:
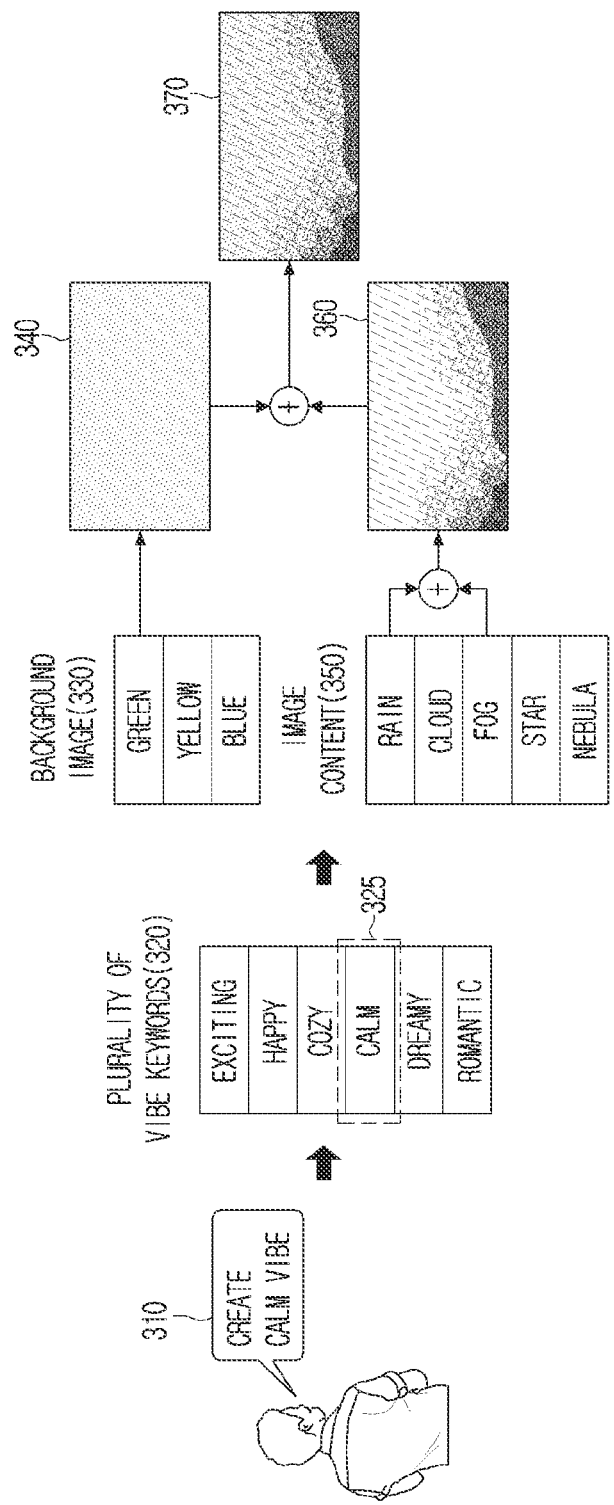
FIG. 3 is a diagram illustrating an example method for generating an image corresponding to a user's speech according to various embodiments.

For example, referring to FIG. 3, when the user's speech is "Create calm vibe" 310, the processor 140 may determine that the vibe keyword included in the user's speech is "calm" 325 among the plurality of predetermined vibe keywords 320.

Referring to a list 330 for predefined background images for "calm" 325, the processor 140 may determine that a green background image, a yellow background image, and a blue background image correspond to the predefined background images for "calm" 325.

The processor 140 may select one background image, for example, the green background image 340 among the green background image, the yellow background image, and the blue background image.

Referring to the list 350 for the predefined image content for "calm" 325, the processor 140 may determine that a rain image, a cloud image, a fog image, a stars image, and a nebula image correspond to predefined image contents for "calm" 325.

The processor 140 may randomly select the rain image and the fog image among the rain image, the cloud image, the fog image, the stars image, and the nebula image, generate an image content 360 to overlay on the green background image 340 by combining the selected image content.

The processor 140 may generate an image 370 by overlaying the image content 360 on the green background image 340.

The processor 140 may transit the green background image to the yellow background image and transit the yellow background image to the blue background image in sequence over time.

In addition, the processor 140 may randomly select two images of the rain image, the cloud image, the fog image, the stars image, and the nebula image, and change the image content over time by overlaying a combination of the selected image contents on the background image.

As described above, the processor 140 may generate an image corresponding to the user's speech "Create calm vibe" 310.

The processor 140 may generate a sound corresponding to the user's speech based on a sound component corresponding to the determined vibe keyword and output the generated sound through the speaker 120.

The sound component may include a plurality of background sounds and a plurality of sound contents.

The plurality of background sounds may be background music of various genres and the plurality of sound contents may include sounds made according to environment phenomena such as a bird sound, a rain sound, a wind sound, a sound of leaves trembling by the wind, sounds of various animals, a sound of baby laughing, a train sound, an airplane sound, and the like, and sounds of various living things and objects existing in the environment.

For example, the processor 140 may determine a plurality of background sounds and a plurality of image sounds corresponding to the determined vibe keyword among the plurality of background sounds and plurality of sound contents stored in the electronic apparatus 100.

For this, the electronic apparatus 100 may store a list for the background sounds and a list for sound contents predefined for each vibe keyword in advance for each of the plurality of predetermined vibe keywords.

Accordingly, the processor 140 may determine the plurality of background sounds and the plurality of sound contents included in the list predefined for the determined vibe keyword among the plurality of background sounds and the plurality of sound contents pre-stored in the electronic apparatus 100, as the plurality of background sounds and the plurality of sound contents corresponding to the determined vibe keyword.

The processor 140 may generate a sound corresponding to a user's speech using the plurality of background sounds and the plurality of sound contents corresponding to the determined vibe keyword.

For example, the processor 140 may generate the sound corresponding to the user's speech by mixing the plurality of sound contents with the plurality of background sounds that change in sequence.

In other words, the processor 140 may generate the sound corresponding to the user's speech by transiting the plurality of background sounds in sequence over time and mixing the background sounds with the plurality of sound contents.

In this example, the processor 140 may randomly select at least two of the plurality of sound contents and mix the background sounds by combining the selected sound contents. In this case, the processor 140 may randomly change a volume of the sound content over time. Accordingly, the volume of the sound content output along with the background sound may be randomly changed.

In addition, in some cases, the processor 140 may randomly select at least two of the plurality of sound contents at every certain time interval, and mix with the background sound by combining the selected sound contents. Accordingly, the combination of the sound contents mixed with the background sound may be randomly changed at every certain time interval. However, this is merely an example, and the processor 140 may randomly select one sound content of the plurality of sound contents and mix the selected sound content with the background sound.

Figure 4:
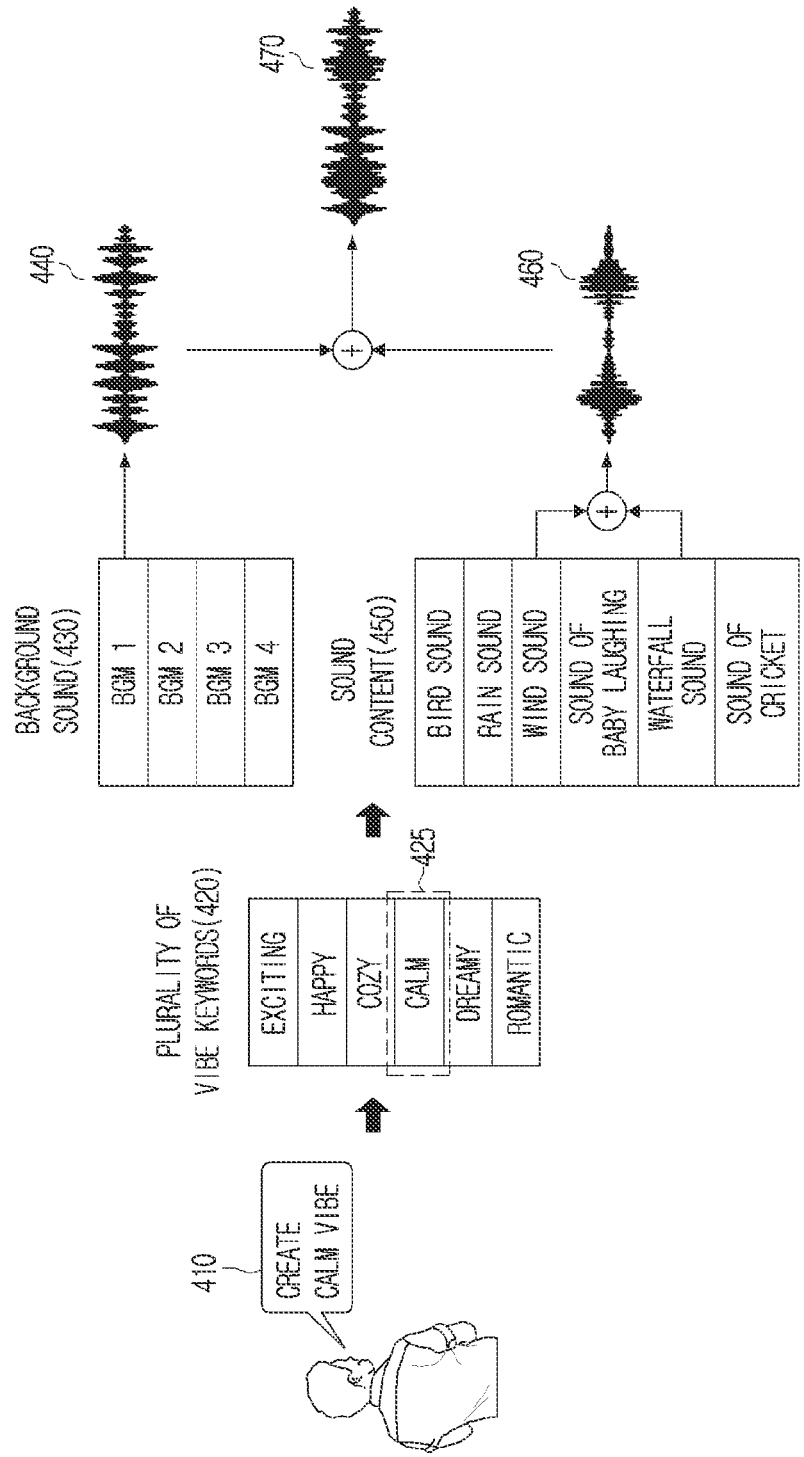
FIG. 4 is a diagram illustrating an example method for generating a sound corresponding to a user's speech according to various embodiments.

For example, referring to FIG. 4, when a user's speech is "Create calm vibe" 410, the processor 140 may determine that a vibe keyword included in the user's speech is "calm" 425 among a plurality of predetermined vibe keywords 420.

The processor 140 may determine that bgm1, bgm2, bgm3, and bgm4 correspond to predefined background sounds for "calm" 425, referring to a list 430 for the background sounds predefined for "calm" 425.

The processor 140 may select one background sound, for example, bgm1 440 of bgm1, bgm2, bgm3, and bgm4.

The processor 140 may determine that the bird sound, the a rain sound, the wind sound, a sound of baby laughing, a waterfall sound, and a sound of cricket correspond to sound contents predefined for "calm" 425 referring to a list 450 for the sound contents predefined for the vibe keyword "calm" 425.

The processor 140 may randomly select the rain sound and the waterfall sound among the bird sound, the rain sound, the wind sound, a sound of baby laughing, the waterfall sound, and a sound of cricket, and generate a sound content 460 to be mixed with the bgm1 440 by combining the selected sound contents.

The processor 140 may generate a sound 470 by mixing the sound content 460 with the bgm1 440.

The processor 140 may transit the bgm1 to the bgm4, transit the bgm4 to the bgm2 and transit the bgm2 to the bgm3 over time. In addition, the processor 140 may randomly change the volume of the rain sound and the waterfall sound to be mixed with the background sound over time.

As described above, the processor 140 may generate a sound corresponding to the user's speech "Create calm vibe" 410.

The processor 140 may display the generated image on the display 130 and output the generated sound through the speaker 120.

Figure 5A:
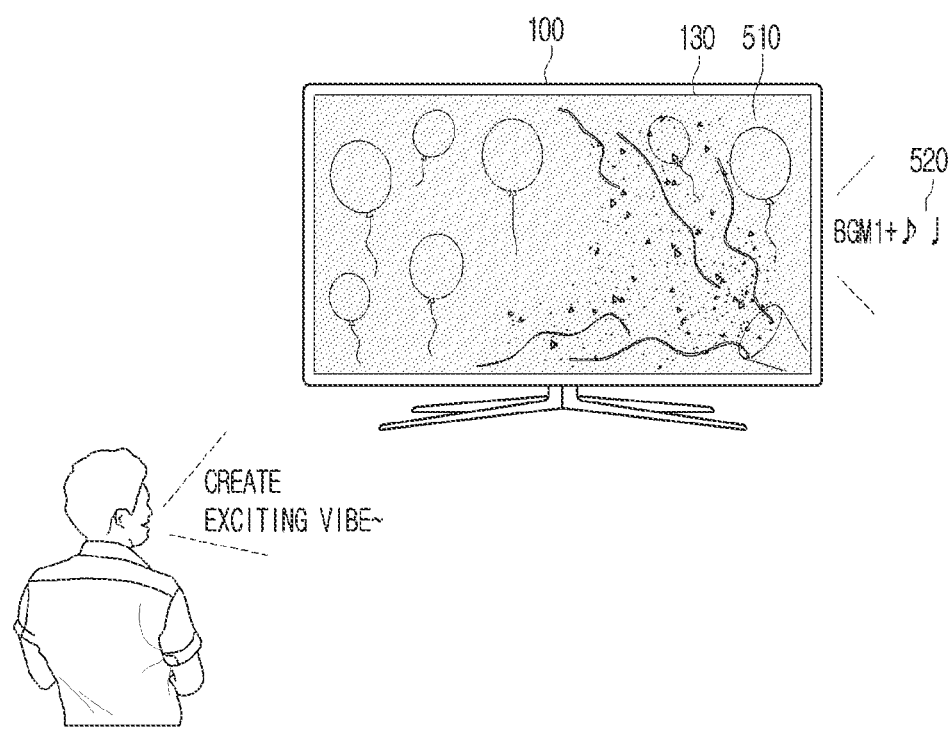
FIGS. 5A and 5B are diagrams illustrating an example method for outputting an image and a sound corresponding to a user's speech according to various embodiments.
Figure 5B:
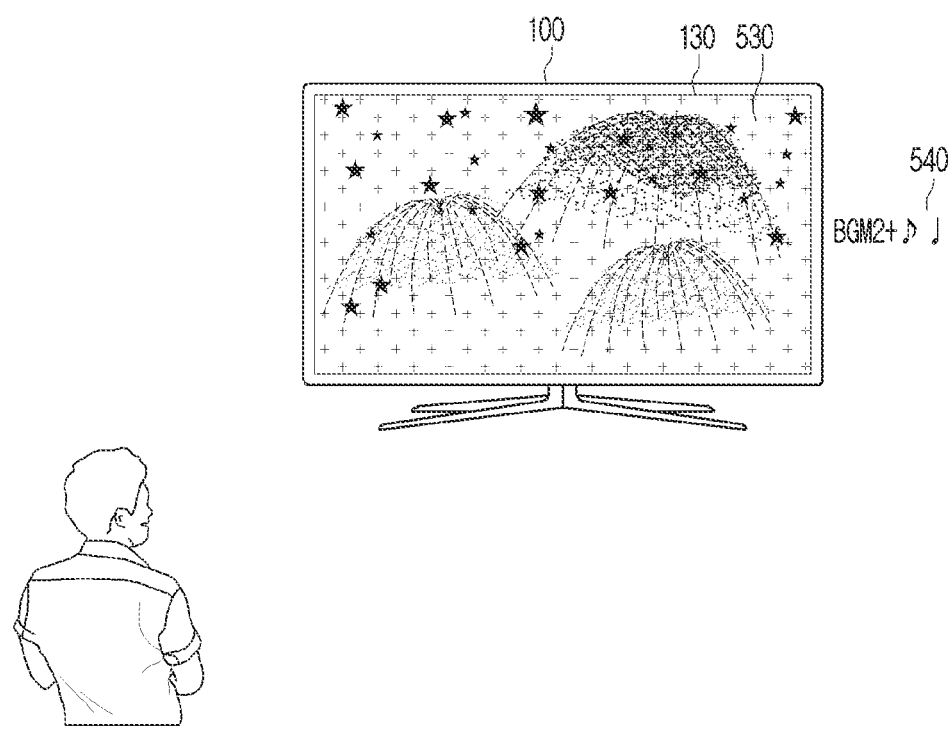

For example, referring to FIGS. 5A and 5B, it is assumed that the user utters "Create exciting vibe".

In this case, the processor 140 may generate the image and the sound corresponding to the vibe keyword corresponding to "exciting", display the generated image on the display 130, and output the generated sound through the speaker 120.

For example, referring to FIG. 5A, the processor 140 may display an image 510 in which images of balloons and confetti are overlapped on the blue background image on the display 130, and output a sound 520 obtained by mixing the sound of baby laughing and bird sound with the bgm1 through the speaker 120.

As a certain time passes, referring to FIG. 5B, the processor 140 may transit the blue background image to the yellow background image, and display an image 530 in which images of stars and firecrackers are overlapped on the yellow background image on the display 130. The processor 140 may transit the background sound from the bgm1 to the bgm2 and output a sound 540 obtained by mixing the sound of baby laughing and the bird sound with the bgm2 through the speaker 120.

In the above examples, it is assumed that the plurality of predetermined vibe keywords are adjectives such as "exciting", "happy", "cozy", "calm", "dreamy", "romantic", and the like, but these are merely examples, and according to various embodiments of the disclosure, various words may be predetermined as vibe-related words.

For example, the vibe-related word may include "matched well with today's weather".

In other words, when a text converted from a user's speech includes a word "vibe" and "matched well with today's weather" is in front of the word "vibe", the processor 140 may determine that the user's speech corresponds to a speech requesting for a specific vibe.

In this example, the processor 140 may determine that one vibe keyword among the plurality of predetermined vie keywords as a vibe keyword corresponding to the vibe-related word.

For example, the processor 140 may search for the weather through web search for "matched well with today's weather" and determine the vibe keyword using the searched weather.

For this, the electronic apparatus 100 may store information on vibe keywords matched with each weather in advance.

For example, a vibe keyword matched with the sunny weather may be "exciting", a vibe keyword matched with "foggy weather" may be "dreamy", and a vibe keyword matched to "warm weather" may be "happy". However, this is merely an example, and a best matched vibe keyword may be matched with each of various weathers in advance.

Accordingly, the processor 140 may determine the vibe keyword corresponding to the vibe-related word based on the information on the searched weather.

For example, it is assumed that the user's speech is "Create vibe matched well with today's weather".

In this case, the processor 140 may determine that "matched well with today's weather" is vibe-related words in the text converted form the user's speech. In a case where the today's weather is sunny, the processor 140 may determine that a vibe keyword for "matched well with today's weather" is "exciting".

In another example, the vibe-related word may include "matched well with current situation".

In other words, when text converted from the user's speech includes a word "vibe" and "matched well with current situation" is in front of the word "vibe", the processor 140 may determine that the user's speech corresponds to a speech requesting for a specific vibe.

In this example, the processor 140 may determine one vibe keyword of the plurality of predetermined vibe keywords as a vibe keyword corresponding to the vibe-related word.

For example, the processor 140 may search for the weather through the web search for "matched well with current situation" and determine the vibe keyword using the searched weather, current time and/or season, and the like.

For this, the electronic apparatus 100 may store information on the vibe keyword matched with each weather, time, and/or season in advance.

For example, a vibe keyword matched with the foggy weather at night may be "dreamy", a vibe keyword matched with the cool weather in autumn may be "cozy", and a vibe keyword matched with the sunny weather at daytime in spring may be "happy". However, this is merely an example, and best matched vibe keyword may be matched with each of various weathers, time, and/or season in advance.

Accordingly, the processor 140 may determine the vibe keyword corresponding to the vibe-related word using the searched weather, current time and/or season.

For example, it is assumed that the user's speech is "Create vibe matched with current situation".

In this case, the processor 140 may determine that "matched today" in the text converted from the user's speech is the vibe-related words. When the current situation corresponds to the sunny weather at daytime in spring, the processor 140 may determine the vibe keyword for "matched well with current situation" as "happy".

As described above, according to an embodiment of the disclosure, the plurality of predetermined vibe keywords may further include "matched well with current situation" and "matched well with today's weather", in addition to "exciting", "happy", "cozy", "calm", "dreamy", and "romantic".

As described above, according to an embodiment of the disclosure, a list for background images predefined for each vibe keyword, a list for image contents, a list for background sounds, and a list for sound contents for each of the plurality of predetermined vibe keywords may be stored in the electronic apparatus 100 in advance.

In this case, the processor 140 may add new background images, image contents, background sounds, and sound contents to the corresponding list or remove some thereof from the list based on a user command.

Such a user command may be input through the user's speech (for example, user's speech such as "Add rain sound" or input through a menu displayed on the electronic apparatus 100.

Figure 6A:
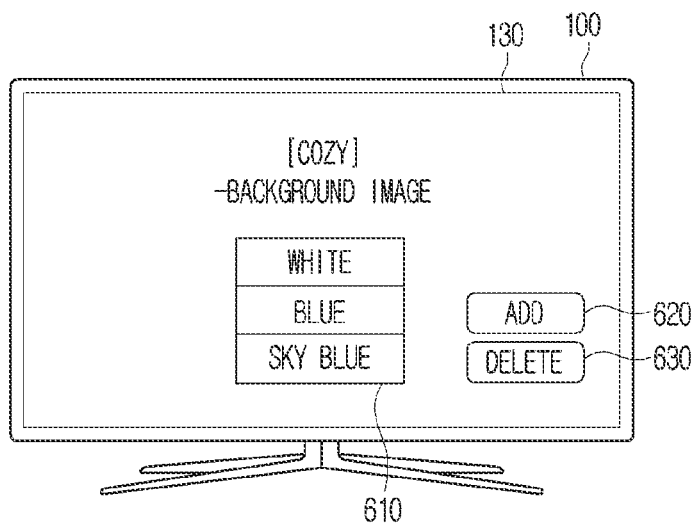
FIGS. 6A, 6B and 6C are diagrams illustrating an example method for editing a list of background images according to various embodiments.

For example, referring to FIG. 6A, when the user command for editing the list for the background images predefined for "cozy" is input, the processor 140 may display a list 610 for the background images predefined for "cozy" on the display 130.

In this case, the processor 140 may display a menu item 620 for adding a new background image to the list 610 and a menu item 630 for removing the background image included in the list 610 on the display 130.

Figure 6B:
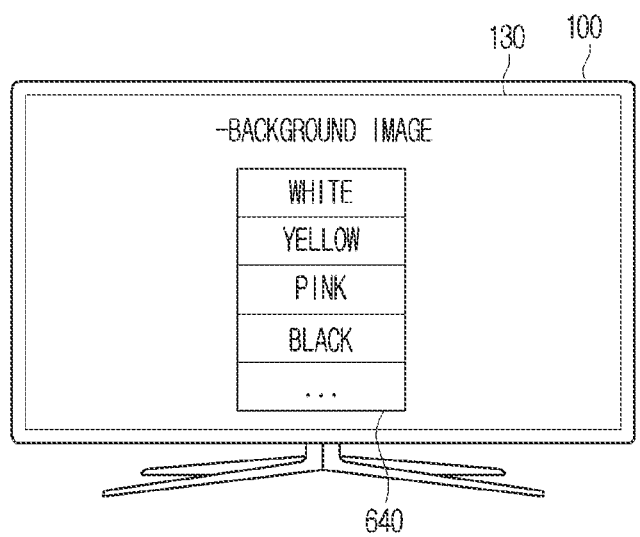

When the user command for selecting the menu item 620 is input, referring to FIG. 6B, the processor 140 may display information 640 on a plurality of background images stored in the electronic apparatus 100 on the display 130.

Accordingly, when the user command for selecting one background image from those is input, the processor 140 may add the selected background image to the list for the background image for "cozy".

Figure 6C:
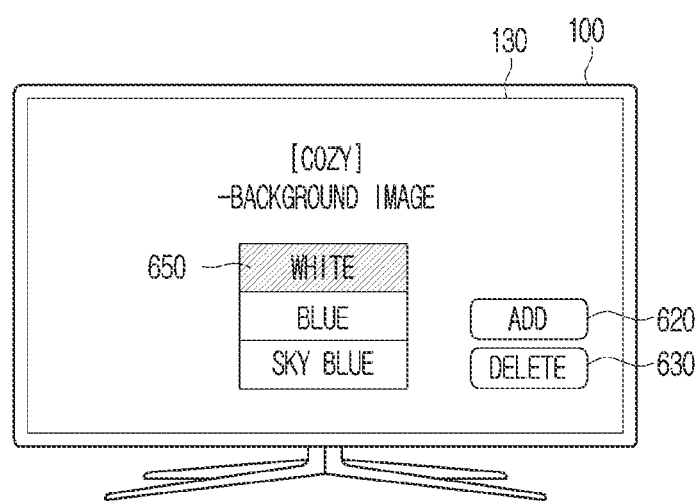

Referring to FIG. 6C, when a user command for selecting a white background image 650 is selected from the list 610 and selecting the menu item 630 is input, the processor 140 may remove the selected white background image from the list for the background image for "cozy".

In FIGS. 6A, 6B and 6C, it is described that a new background image is added to the list of the background images based on the user command or the background image is removed from the list, but this is merely an example, and the processor 140 may add and remove each of the image contents and the background sounds, and the sound contents with respect to the list using the same method.

The electronic apparatus 100 may store each list of the background images, the image contents, the background sounds, and the sound contents corresponding to the vibe keyword for each user.

Accordingly, the processor 140 may generate images and sounds corresponding to the user's speech based on a GUI component and a sound component corresponding to a user who has uttered the user's speech among GUI components and sound components for each of the plurality of users.

For this, the processor 140 may recognize the user who has uttered the user's speech. For example, the processor 140 may recognize the user based on the user's speech or recognize the user using a fingerprint or an ID/password input to the electronic apparatus 100.

The processor 140 may determine the GUI component and the sound component corresponding to the recognized user.

In other words, the processor 140 may determine the lists of the background images, the image contents, the background sounds, and the sound contents of the recognized user among the lists of the background images, the image contents, the background sounds, and the sound contents pre-stored for each of the plurality of users. The processor 140 may generate images and sounds corresponding to the user's speech using the list for the recognized user.

As described above, the processor 140 may store the lists of the background images, the image contents, the background sounds, and the sound contents for each user in an external server (not illustrated), and may receive the list stored in the external server (not illustrated) from the external server (not illustrated). Accordingly, various users may share the list through the external server (not illustrated).

Figure 7:
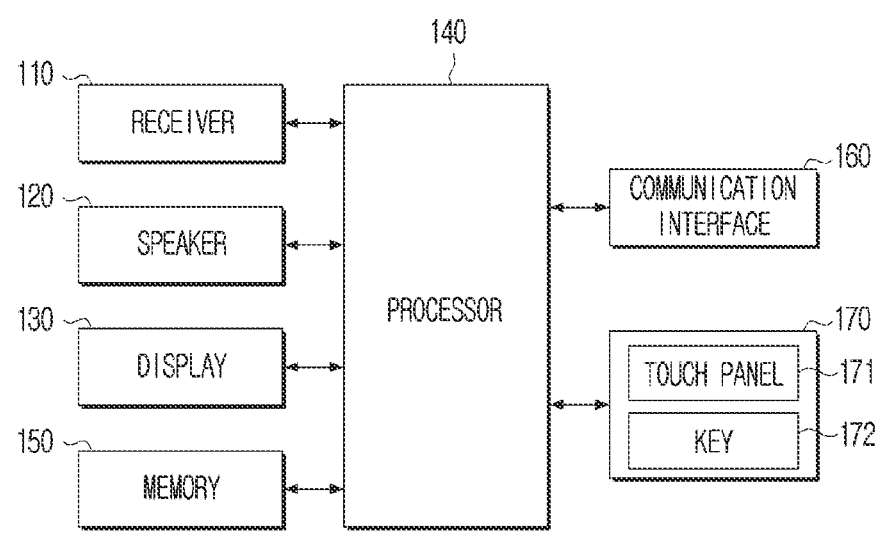
FIG. 7 is a block diagram illustrating an example configuration of the electronic apparatus according to various embodiments.

FIG. 7 is a block diagram illustrating an example configuration of the electronic apparatus according to an embodiment.

Referring to FIG. 7, the electronic apparatus 100 may include the receiver (e.g., including receiving circuitry) 110, the speaker 120, the display 130, the processor (e.g., including processing circuitry) 140, a memory 150, a communication interface (e.g., including communication circuitry) 160, and a user inputter (e.g., including input circuitry) 170. These elements may be controlled by the processor 140.

The receiver 110, the speaker 120, the display 130, and the processor 140 perform the same function as in FIG. 2, and the overlapped description for these elements may not be repeated.

The memory 150 may store an instruction or data related to at least one of other components of the electronic apparatus 100. The memory 150 may be implemented as a non-volatile memory, a volatile memory, a flash memory, a hard disk drive (HDD), or a solid-state drive (SSD). The memory 150 may be accessed by the processor 140 and reading, recording, editing, deleting, or updating of the data by the processor 140 may be executed. A term, memory, in the disclosure may include the memory 150, a ROM (not illustrated) and a RAM (not illustrated) in the processor 140, or a memory card (not illustrated) (e.g., micro SD card or memory stick) mounted on the electronic apparatus 100.

In addition, the memory 150 may store various data for generating images and sounds corresponding to the vibe requested by the user.

For example, the memory 150 may store the plurality of background images, the plurality of image contents, the plurality of background sounds, and the plurality of sound contents, and store the lists for the background images, the image contents, the background sounds, and the sound contents corresponding to each vibe keyword for each of the vibe keywords.

The communication interface 160 may include various communication circuitry and communicate with various types of external devices according to various types of communication methods. The communication interface 160 may include at least one of a Bluetooth chip, a wireless communication chip, an NFC chip, an Ethernet chip.

In this example, the processor 140 may communicate with a server or various external devices through the communication interface 160.

The communication interface 160 is illustrated as a separate configuration from the receiver 110, but this is merely for convenience of description, and the communication interface 160 may communicate with an electronic apparatus including a microphone (not illustrated) and receive a user's speech obtained from the electronic apparatus from the electronic apparatus.

The user inputter 170 may include various input circuitry and receive an input of various user commands and transfers the input user command to the processor 140. The user inputter 170 may include, for example, a touch panel 171 and/or a key 172. The touch panel 171 may use, for example, at least one type of an electrostatic type, a pressure-sensitive type, an infrared type, or an ultrasonic type. In addition, the touch panel 171 may further include a control circuit. The touch panel 171 may further include a tactile layer and provide tactile sensation to the user. The key 172 may include, for example, physical buttons, optical keys, or a keypad.

In this example, the processor 120 may include various processing circuitry and control other elements to execute various functions corresponding to the user command input through the user inputter 170.

In addition, although not illustrated in FIG. 7, the electronic apparatus 100 may further include a remote control signal receiver (not illustrated). In this case, the remote control signal receiver (not illustrated) may be implemented as an IR receiver (not illustrated) for receiving a remote control signal transmitted from a remote control for controlling the electronic apparatus 100.

In this example, the processor 140 may control other elements to execute various functions corresponding to a remote control signal received through the remote control signal receiver (not illustrated).

The processor 140 may control general operations of the electronic apparatus 100 using various programs stored in the memory 150.

Figure 8:
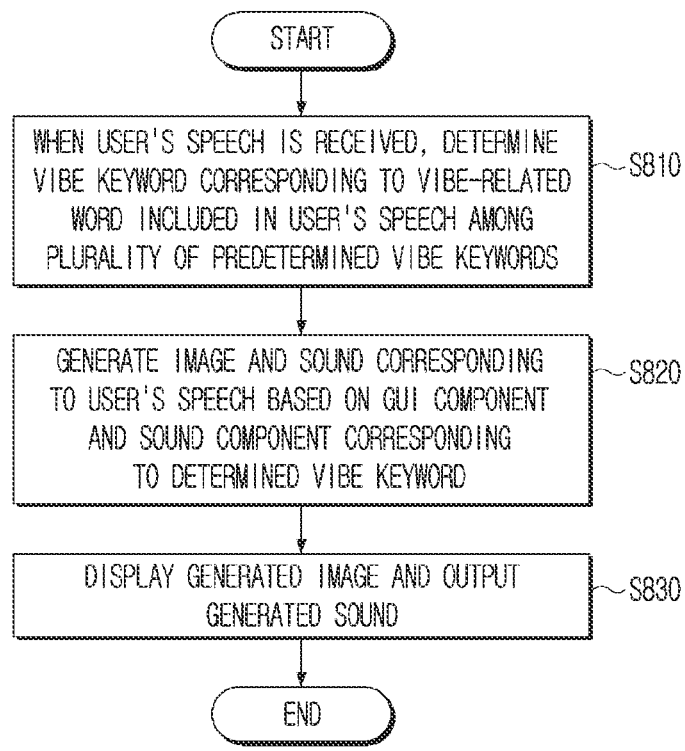
FIG. 8 is a flowchart illustrating an example method for controlling an electronic apparatus according various embodiments.

FIG. 8 is a flowchart illustrating an example method for controlling an electronic apparatus according to various embodiments.

When the user's speech is received, a vibe keyword corresponding to a vibe-related word included in a user's speech is determined among a plurality of predetermined vibe keywords (S810).

An image and a sound corresponding to the user's speech are generated based on a GUI component and a sound component corresponding to the determined vibe keyword (S820).

The generated image is displayed and the generated sound is output (S830).

In operation S810, when the text converted from the user's speech includes a word corresponding to a vibe and a vibe-related word modifying the word corresponding to the vibe, it may be determined that the user's speech corresponds to a user's speech requesting for a specific vibe, and a vibe keyword corresponding to the vibe-related word included in the user's speech may be determined among the plurality of predetermined vibe keywords.

In operation S810, when the vibe-related word is matched with one of the plurality of predetermined vibe keywords, the matched vibe keyword may be determined as a vibe keyword corresponding to the vibe-related word, and when there is no vibe keyword matched with the vibe-related word among the plurality of predetermined vibe keywords, a vibe keyword similar to the vibe-related words among the plurality of predetermined vibe keywords may be determined as a vibe keyword corresponding to the vibe-related word.

In this example, in operation S810, a vector value corresponding to each of the plurality of predetermined vibe keywords and a vector value corresponding to the vibe-related word may be determined, and a vibe keyword having a vector value with the shortest distance with the vector value corresponding to the vibe-related word among the vector values corresponding to each of the plurality of predetermined vibe keywords may be determined as a vibe keyword corresponding to the vibe-related word.

In addition, a GUI component may include a plurality of background images and a plurality of image contents, and in operation S820, the plurality of image contents may be overlaid on the plurality of background images that changes in sequence, and an image corresponding to the user's speech may be generated.

In addition, a sound component may include a plurality of background sounds and a plurality of sound contents, and in operation S820, the plurality of sound contents may be mixed with the plurality of background sounds that change in sequence, and a sound corresponding to the user's speech may be generated.

In operation S820, an image and a sound corresponding to the user's speech may be generated based on the GUI component and the sound component corresponding to the user who utters the user's speech among the GUI component and sound component for each of the plurality of users.

A specific method for generating the image and sound corresponding to the vibe requested by the user has been described above.

Various embodiments of the disclosure may be implemented as software including instructions stored in machine (e.g., computer)-readable storage media. The machine is an apparatus which invokes instructions stored in the storage medium and is operated according to the invoked instructions, and may include an electronic apparatus (e.g., electronic apparatus A) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
a receiver;
a speaker;
a display; and
a processor, comprising processing circuitry, configured to:
based on a user's speech being received through the receiver, determine whether a word corresponding to a vibe and a vibe-related word modifying the word corresponding to the vibe is included in a text converted from the user's speech,
based on the text converted from the user's speech including the word corresponding to the vibe, a first vibe-related word and a second vibe-related word modifying the word corresponding to the vibe, determine a first vector value corresponding to the first vibe-related word, a second vector value corresponding to the second vibe-related word and a vector value corresponding to each of the plurality of predetermined vibe keywords,
determine a vibe keyword corresponding to a vector value with a shortest distance with a third vector value, obtained by summing the first vector value and the second vector value, among the vector value corresponding to each of the plurality of predetermined vibe keywords,
generate an image and a sound corresponding to the user's speech based on a GUI component and a sound component corresponding to the determined vibe keyword, and
display the generated image on the display and output the generated sound through the speaker.

2. The electronic apparatus according to claim 1, wherein the processor is configured to:
based on the text including the word corresponding to the vibe and a third vibe-related word modifying the word corresponding to the vibe, and based on the plurality of predetermined vibe keywords not including a vibe keyword matched with the third vibe-related word, determine that a vibe keyword most similar to the third vibe-related word of the plurality of predetermined vibe keywords is the vibe keyword corresponding to the third vibe-related word.

3. The electronic apparatus according to claim 2, wherein the processor is configured to determine a vector value corresponding to each of the plurality of predetermined vibe keywords and a vector value corresponding to the third vibe-related word, and determine that a vibe keyword having a vector value with a shortest distance with the vector value corresponding to the third vibe-related word among vector values corresponding to each of the plurality of predetermined vibe keywords is a vibe keyword corresponding to the third vibe-related word.

4. The electronic apparatus according to claim 1, wherein the GUI component comprises a plurality of background images and a plurality of image contents, and
wherein the processor is configured to overlay the plurality of image contents on the plurality of background images that change in sequence, and generate an image corresponding to the user's speech.

5. The electronic apparatus according to claim 1, wherein the sound component comprises a plurality of background sounds and a plurality of sound contents, and
wherein the processor is configured to mix the plurality of sound contents with the plurality of background sounds that change in sequence, and generate a sound corresponding to the user's speech.

6. The electronic apparatus according to claim 1, wherein the processor is configured to generate an image and a sound corresponding to the user's speech based on a GUI component and a sound component corresponding to a user who has uttered the user's speech among the GUI components and the sound components for each of a plurality of users.

7. A method for controlling an electronic apparatus, the method comprising:
based on a user's speech being received, determining whether a word corresponding to a vibe and a vibe-related word modifying the word corresponding to the vibe is included in a text converted from the user's speech,
based on the text converted from the user's speech including the word corresponding to the vibe, a first vibe-related word and a second vibe-related word modifying the word corresponding to the vibe, determining a first vector value corresponding to the first vibe-related word, a second vector value corresponding to the second vibe-related word and a vector value corresponding to each of the plurality of predetermined vibe keywords,
determining a vibe keyword corresponding to a vector value with a shortest distance with a third vector value, obtained by summing the first vector value and the second vector value, among the vector value corresponding to each of the plurality of predetermined vibe keywords,
generating an image and a sound corresponding to the user's speech based on a GUI component and a sound component corresponding to the determined vibe keyword; and
displaying the generated image and outputting the generated sound.

8. The method according to claim 7, wherein the determining comprises:
based on the text including the word corresponding to the vibe and a third vibe-related word modifying the word corresponding to the vibe, and based on the plurality of predetermined vibe keywords not including the vibe keyword matched with the third vibe-related word, determining that a vibe keyword most similar to the third vibe-related word of the plurality of predetermined vibe keywords is the vibe keyword corresponding to the third vibe-related word.

9. The method according to claim 8, wherein the determining comprises:

determining a vector value corresponding to each of the plurality of predetermined vibe keywords and a vector value corresponding to the third vibe-related word; and determining that a vibe keyword having a vector value with a shortest distance with the vector value corresponding to the third vibe-related word among vector values corresponding to each of the plurality of predetermined vibe keywords is a vibe keyword corresponding to the third vibe-related word.

10. The method according to claim 7, wherein the GUI component comprises a plurality of background images and a plurality of image contents, and wherein the generating comprises overlaying the plurality of image contents on the plurality of background images that change in sequence, and generating an image corresponding to the user's speech.

11. The method according to claim 7, wherein the sound component comprises a plurality of background sounds and a plurality of sound contents, and wherein the generating comprises mixing the plurality of sound contents with the plurality of background sounds that change in sequence, and generating a sound corresponding to the user's speech.

12. The method according to claim 7, wherein the generating comprises generating an image and a sound corresponding to the user's speech based on a GUI component and a sound component corresponding to a user who has uttered the user's speech among the GUI components and the sound components for each of a plurality of users.

* * * * *